United States Patent [19]

Hunter

[11] Patent Number: 4,831,508

[45] Date of Patent: May 16, 1989

[54] POWER SUPPLY SYSTEM HAVING IMPROVED INPUT POWER FACTOR

[75] Inventor: Patrick L. Hunter, Miami Lakes, Fla.

[73] Assignee: Computer Products Inc., Pompano Beach, Fla.

[21] Appl. No.: 111,409

[22] Filed: Oct. 20, 1987

[51] Int. Cl.$^4$ ............................................. H02M 1/70
[52] U.S. Cl. ......................................... 363/44; 363/48; 363/89; 363/126
[58] Field of Search ........................ 363/44, 47, 48, 84, 363/89, 124, 126; 323/205, 207-211

[56] References Cited

U.S. PATENT DOCUMENTS

| 4,074,344 | 2/1978 | Pitel | 363/44 |
| 4,222,096 | 9/1980 | Capewell | 363/44 |
| 4,340,931 | 7/1982 | Endo et al. | 363/44 |
| 4,369,490 | 1/1983 | Blum | 363/48 |
| 4,683,529 | 7/1987 | Bucher, II | 363/44 |

FOREIGN PATENT DOCUMENTS 0017931  2/1978  Japan ..................................... 363/44

Primary Examiner—Peter S. Wong
Attorney, Agent, or Firm—Eugene F. Malin

[57] ABSTRACT

A circuit and method using a low frequency active switch for improving input power factor in power supplies utilizing a full wave rectifier and capacitor filter for supplying a filtered DC voltage from an AC power source. A switch control activates and deactivates an active switching once in each half cycle of the alternating voltage input. The switch control is connected to the active switching for operating the circuit providing high power factor.

7 Claims, 7 Drawing Sheets

POWER SUPPLY SYSTEM HAVING IMPROVED INPUT POWER FACTOR

BACKGROUND OF THE INVENTION

This invention relates to a method using a low frequency active switch for improving input power factor in power supplies utilizing a full wave rectifier and capacitor filter for supplying a filtered DC voltage from an AC power source. More specifically, it would be applied, but not limited to, high frequency power supplies which utilize direct off-line rectification and filtering of an AC source to generate a high voltage DC input to a high frequency DC to DC converter load circuit.

In the conventional rectifier and filter systems the input power factor is typically in the range 0.65 to 0.70. Power factor is defined here as input power (watts) divided by the product if AC input voltage (Volts RMS) and AC input current (Amperes RMS).

$$PF = (P_{in}/E_{RMS} I_{RMS})$$

Ideally this factor is unity (1.0) if the load seen by the AC source is purely resistive. In the typical rectifier and capacitor filter circuit the AC input current occurs in pulses, is highly distorted, and has a fundamental frequency component which is phase displaced with respect to the AC input voltage waveform. These factors cause the RMS value of the AC input current to be high and the resultant power factor to be low, i.e. between (0.65 and 0.70).

A conventional technique for improving power factor is to utilize tuned passive filters between the AC source and rectifier circuit. These are comprised of linear inductors and capacitors connected in various series and parallel circuits. These techniques are costly, large in size, frequency sensitive, provide significant loss in efficiency, and cannot provide significant improvement over wide AC input voltage, input frequency, and load ranges.

A second widely used technique is to provide a high frequency switching circuit which switches and controls the AC input current to provide an approximately sinusoidal waveform. These techniques provide a high degree of waveform control and power factor improvement, however they are costly, generate high noise, result in significant efficiency loss, and have reduced reliability.

SUMMARY OF THE INVENTION

This invention relates to a new and improved circuit with an active switch and method for improving input power factor in power supplies, where the power factor equals the input power in watts divided by the product of the input voltage (Volts RMS) and input current (Amperes RMS). Such power supplies are normally high frequency power supplies utilizing off-line rectification of an AC source to generate a high voltage DC input to a high frequency DC to DC converter load circuit. The improved circuit includes a linear inductor connected in series with the alternating current (AC) source and rectifier circuit. The output of the rectifier circuit is connected to a capacitor filter circuit for providing a smoothed DC voltage for the load circuit. A switching device is connected across the AC terminals of the rectifier between the inductor and rectifier circuit. The method of operating the active switching device is to control the switch in synchronous relation to the AC input voltage waveform. The switch is switched on and off once in each half cycle of the AC input voltage waveform to provide the source current flow through the inductor, rectifier, filter and load circuit when the switch is nonconducting. The source current flows from AC source through the inductor and switch and back to the AC source when the switch is conducting. Source current is built up during a short time internal during the initial part of the AC input waveform when the active switch is conducting. By controlling the time internal when the active switch is conducting the input current waveform can be controlled to achieve a waveform that is relatively low in harmonic content and having a fundamental frequency component in phase with the AC source voltage waveform. These are necessary criteria for achieving high power factor. By properly scaling the value of the inductor add selecting optimum values of the active switch conduction time the power factor is increased to values typically above 0.95.

The concept and circuits disclosed in this invention utilize a low frequency active switching circuit in combination with an inductive impedance. The active switch is switched to a conductive state once in each half cycle of the AC source voltage in synchronous relation. By controlling the phase relationship and conduction time of the active switch within each half-cycle of the AC voltage waveform the power factor can be controlled and maintained at high values over wide input voltage, frequency, and load ranges. Typical values in the range 0.95 to 0.98 are easily achieved.

It is an object of this invention to provide an active means for improving the input power factor to a high quantity close to unity.

Another object of the invention is to achieve a high power factor with minimum loss in efficiency.

Another object of this invention is to provide a circuit which has effective power factor improvement over wide ranges of input AC voltage, input frequency, and load.

Another object of this invention is to provide a circuit which can be easily changed in the field between different nominal AC input voltage ranges such 115 VAC and 230 VAC.

A further object of this invention is to minimize effect on product cost, complexity, and package size.

A further object is to provide significant reduction in the harmonic current content in the AC input circuit waveform.

A further object is to provide a circuit which has low conducted noise (EMI) content to help in meeting EMI specifications.

An additional object is to provide a circuit which is inherently protected for transient voltage disturbances in the AC source.

In accordance with these and other objects which will be apparent hereinafter, the instant invention will now be described with particular reference to the accompanying drawings.

DESCRIPTION OF PREFERRED EMBODIMENTS

Figure 1:
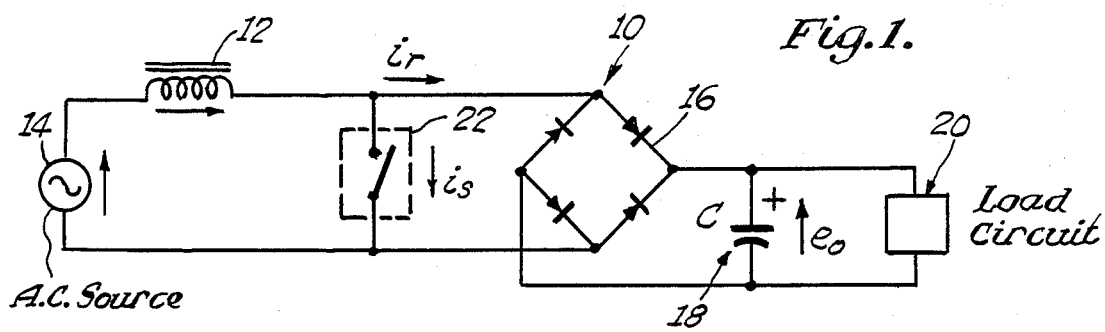
FIG. 1 is a schematic of one embodiment of the power supply circuit including an inductor and a controlled switch that provides a high power factor.
Figure 2A:
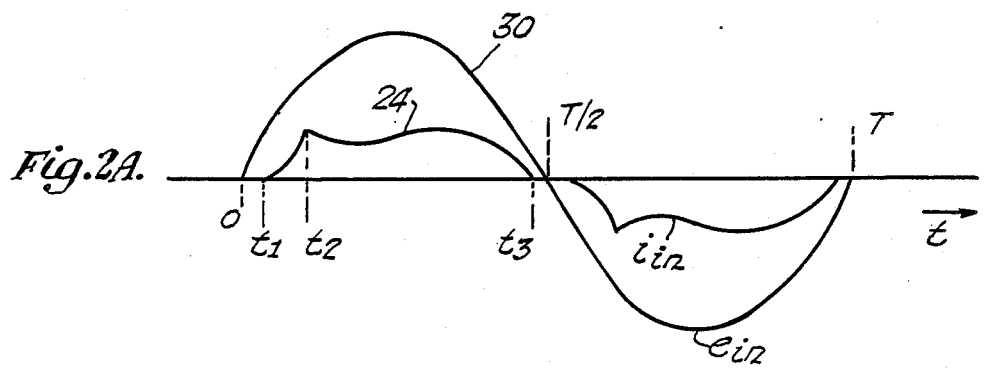
FIG. 2A is a graph of one cycle of the source voltage and source current as a function of time.
Figure 2B:
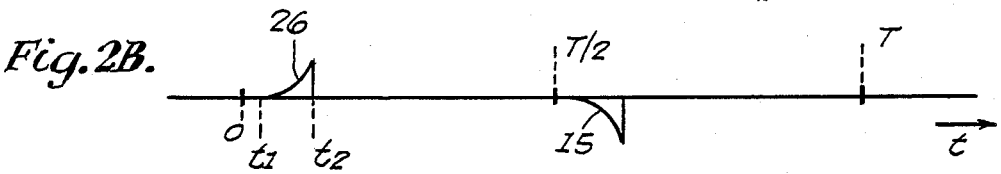
FIG. 2B is a graph of the current through the active switch as a function of time.
Figure 2C:
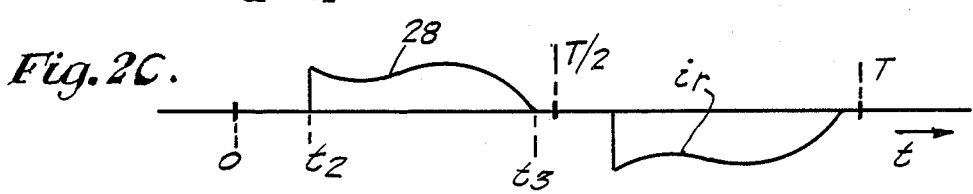
FIG. 2C is a graph of the current through the AC terminals of the rectifier as a function of time.

Referring now to the drawings, a fundamental circuit diagram of a power supply circuit utilizing the power factor improvement circuit is shown in FIG. 1. A linear inductor 12 is connected in series with the alternating current (AC) source 14 and rectifier circuit 16 as shown. The output of rectifier 16 is connected to a capacitor 18 for providing a smoothed DC voltage for the load circuit 20. In one embodiment an active switching device 22 is connected across the AC terminals of the rectifier 16 between inductor 12 and rectifier 16. The switching device 22 is controlled to switch in synchronous relation to the AC input voltage waveform as shown in FIGS. 2A, 2B and 2C. The device is switched to a conducting state at time $t_1$, and switched off to a non-conducting state at time $t_2$. The switch 22 is switched on and off once in each half cycle of the AC input voltage waveform. The source current $i_{in}$ flows through inductor 12, rectifier 16, filter 18 and load circuit 20 when switch 22 is nonconducting. The source current $i_{in}$ flows from AC source through inductor 12 and switch 22 between $t_1$ and $t_2$ when switch 22 is conducting. The source current $i_{in}$ is shown in FIG. 2A as 24, switch current $i_s$ is shown in FIG. 2B as 26, and current $i_r$ is shown in FIG. 2C as 28. Source current is built up between $t_1$ and $t_2$ during the initial part of the AC input waveform when switch 22 is conducting. By controlling the times $t_1$ and $t_2$ the input current waveform can be controlled to achieve a waveform that is relatively low in harmonic content and having a fundamental frequency component in phase with the AC source voltage waveform $e_{in}$ shown in FIG. 2A as 30. These are necessary criteria for achieving high power factor. By properly scaling the value of inductor 12 and selecting optimum values of $t_1$ and $t_2$ the power factor is increased to values typically above 0.95.

Figure 3A:
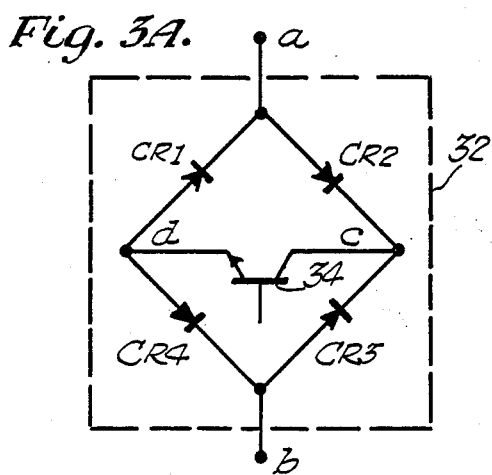
FIG. 3A shows a circuit implementation of the active switch.
Figure 3B:
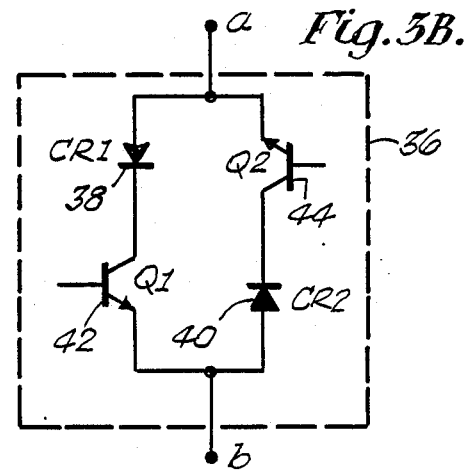
FIG. 3B shows another implementation of the active switch.

FIG. 3A and FIG. 3B show examples of practical implementations of the active switch. FIG. 3A shows switch 32 consisting of a bridge rectifier (CR1–CR4) with a transistor switch 34 connected across the DC terminals c and d. When the switch 32 is conducting the impedance across terminals a and b is low and will freely conduct current in a bilateral means between the terminals a and b. When the switch is off the impedance across terminals a and b is high, preventing the flow of current. Another switch 36 shown in FIG. 3B utilizes two rectifiers 38 and 40 and two transistor switches 4 and 44. Other switching devices and circuits are possible to create a bilateral switching circuit.

Figure 4:
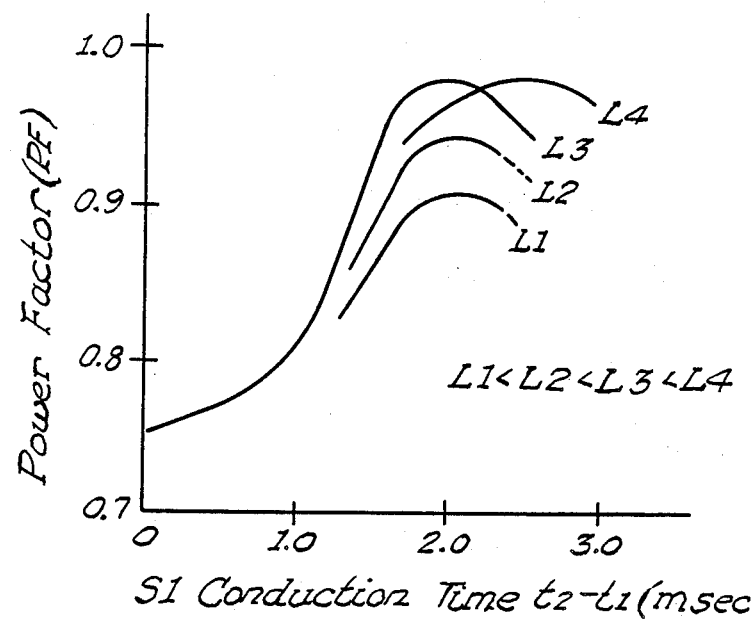
FIG. 4 is a typical graph of power factor vs. conduction time $t_2-t_1$ for different values of inductance.

A method of control is to fix $t_1$ at $t=0$ or at some time near 0 and to control the turn-off time $t_2$. An alernative method would be to fix time $t_2$ at a defined maximum value and control the turn-on time $t_1$. It is essential that the conduction of the switch occurs during the leading or initial part of each half-cycle of the input voltage waveform. For a 60 Hz AC source $t_2-t_1$ would be varied by control means over a typical range 0 to 2.5 ms. FIG. 4 shows typical curves of power factor vs conduction time $t_2-t_1$ for different relative values of inductance L ($L_1$, $L_2$, $L_3$ and $L_4$). If the switch 22 is nonconducting $t_2-t_1=0$ and the power factor is low. If we maintain $t_1=0$ and increase $t_2$ the power factor increases to a high peak value and then decreases as shown by the curves. By optimizing the value of L and switching time $t_2-t_1$ the power factor can be maximized. The maximum achievable value of power factor vs. time $t_2-t_1$ increases as L is increased and reaches an optimum value typically in the range 0.95 to 0.98. Further increases in inductance beyond $L_4$ will cause the maximum value to decrease.

Figure 5:
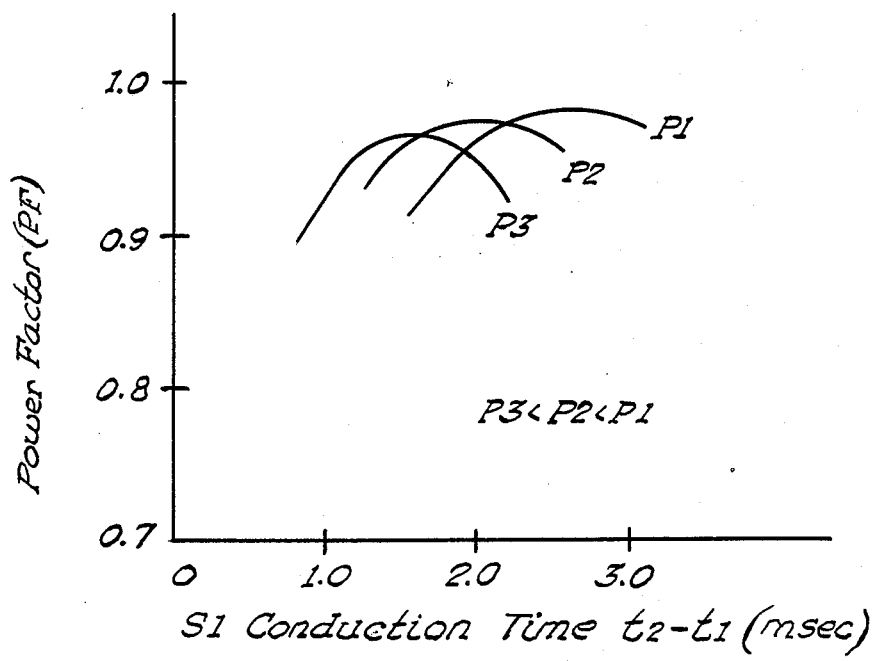
FIG. 5 is a typical graph of power factor vs. conduction time $t_2-t_1$ for different values of load power.

As the load power is varied the maximum value of the power factor (PF) will change as shown in FIG. 5. In this case the optimum value of inductance is chosen to achieve the highest power factor at rated power $P_1$. Optimum power factor remains high over relatively wide load ranges as $t_2-t_1$ is adjusted to achieve the optimum power factor (PF) for each load condition.

Figure 6:
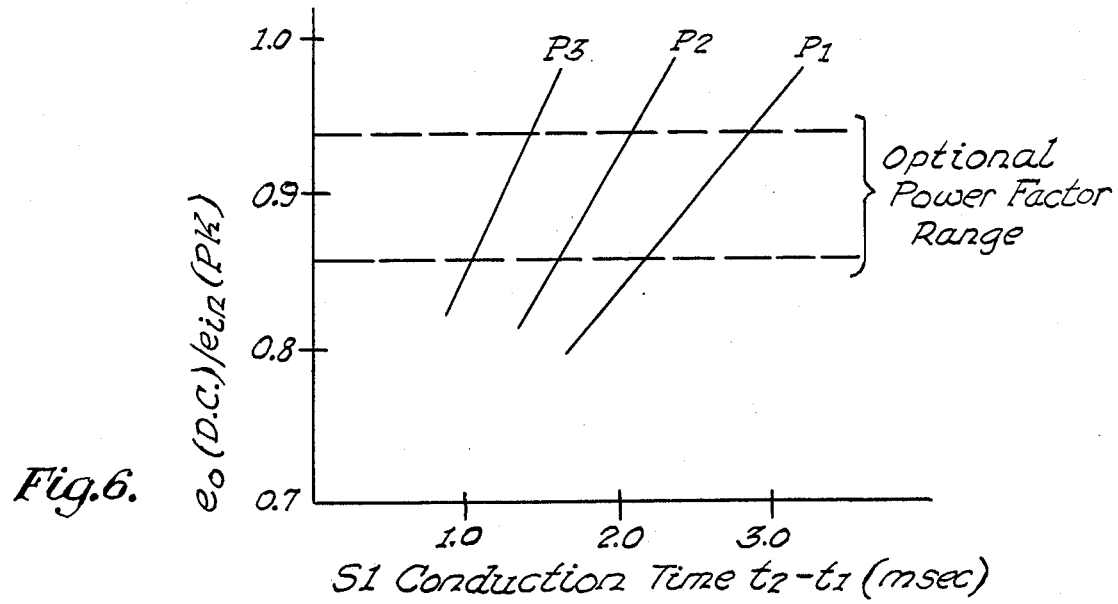
FIG. 6 is a graph of the ratio $e_o/e_{in}$ vs. switch conduction time $t_2-t_1$ for different values of load power.

Once an inductor L has been established to achieve the optimum power factor (PF) for a given set of AC input voltage, frequency, and load conditions, a control means must be utilized to control the conduction time $t_2-t_1$. It is an objective of this invention to maintain high power factor over wide ranges of AC input voltage, frequency and load conditions. It has been established that there is an option relationship between the value of the DC voltage across the load circuit and the peak or RMS value of the source voltage $e_{in}$, which if maintained constant, will result in relatively high power factor for the variables defined above. FIG. 6 shows typical curves of the ratio of the voltage across the load circuit to the peak source voltage, $K=e_o(DC)/e_{in}(PK)$, as a function of conduction time. The DC load voltage increases as conduction time increases for fixed input voltage and load power conditions. As load power is reduced the conduction time must be reduced to maintain a fixed DC voltage across the load. This reduction in conduction time is also necessary to maintain the optimum power factor for reduced load. By maintaining the ratio K at approximately 0.9 the power factor will remain relatively high and constant for changes in AC input voltage, input frequency, and load.

This relationship of DC voltage across the load divided by the peak value of the AC input voltage will vary typically in the range K=0.88 to 0.92, the most optimum ratio being a function of circuit parameters (mainly value of L) and operating conditions. It has been found by emperical data that K=0.9 is a good mean choice.

To accomplish optimum power factor control the active switch conduction time, $t_2-t_1$, is controlled according to the relationship defined in FIG. 6. $t_2-t_1$ is controlled to maintain the DC voltage across the load at the optimum value with respect to the AC input voltage. This is simply done by a control means which compares the DC voltage across the load to a DC voltage proportional to the peak value of the AC input voltage to adjust $t_2-t_1$ to maintain the ratio K at a constant value.

Figure 7A:
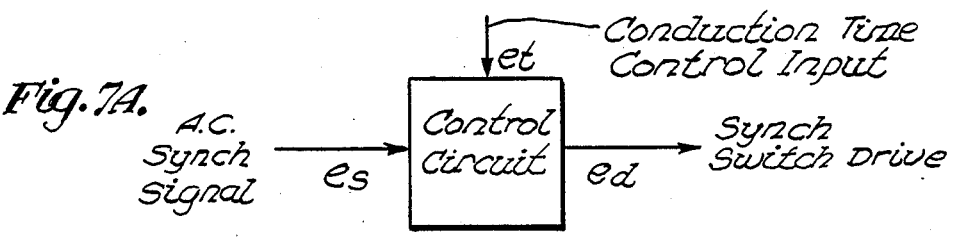
FIG. 7A is a block diagram of the control circuit and the control parameters.
Figure 7B:
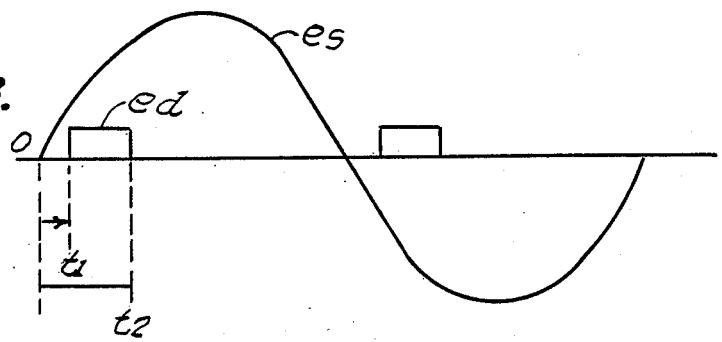
FIG. 7B is a graph illustrating the control parameters and control circuit output signal.

FIG. 7 shows a control block 46 which has two inputs, a low frequency synch signal $e_s$ proportional to the AC source and an analog control input signal $e_t$ to control $t_2-t_1$. The output signal $e_d$ drives the synchronous switch to force it into conduction during time $t_2-t_1$. Two methods of control are preferred. $t_1$ can be fixed and $t_2$ controlled or $t_2$ can be fixed and $t_1$ controlled.

Figure 8:
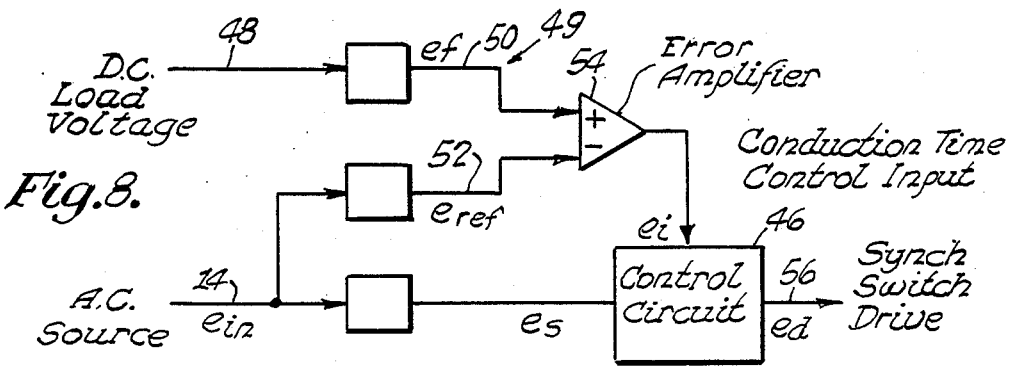
FIG. 8 is a block diagram of a control circuit with interconnecting elements.

Referring now to FIG. 8 showing a block diagram of the complete control circuit 49 utilizing filtered DC load voltage $e_o$ at 48, AC source voltage 14, a variable DC reference $e_{ref}$ 52 proportional to the AC input voltage 14, a voltage $e_f$ 50 proportional to the DC voltage 48 across the load, an error amplifier 54, and synchronized control circuit 46 as defined in FIG. 7. The voltage $e_f$ at 50 is compared with $e_{ref}$ at 52 by the error amplifier 54. The error signal is amplified to provide an analog input $e_t$ to the control circuit 46. The output signal $e_d$ at 56 is a switched output signal with $t_2-t_1$ made proportional to the magnitude of the analog input $e_t$.

If we assume the AC source voltage $e_{in}$ is held constant then $e_{ref}$ will be constant providing a fixed reference input to the error amplifier. If the voltage across the load $e_o$ increases $e_f$ will increase. The error signal $e_f - e_{ref}$ is amplified to provide a corrective input $e_t$ to the control circuit 46. $t_2 - t_1$ is therefore changed to correct $e_o$ and force $e_o$ to be constant. $e_o$ will remain constant for changes in load current and source frequency. Therefore, K will be held constant at its optimum value providing relatively high power factor.

If the AC input voltage changes the reference voltage $e_{ref}$ will change in a proportional manner. $e_f$ will be forced to track $e_{ref}$ for variations in line voltage and will result in a constant K ratio. The load voltage $e_o$ will therefore track proportionately with the AC input voltage to keep K constant and maintain high power factor for large variations in AC input voltage.

Figure 9:
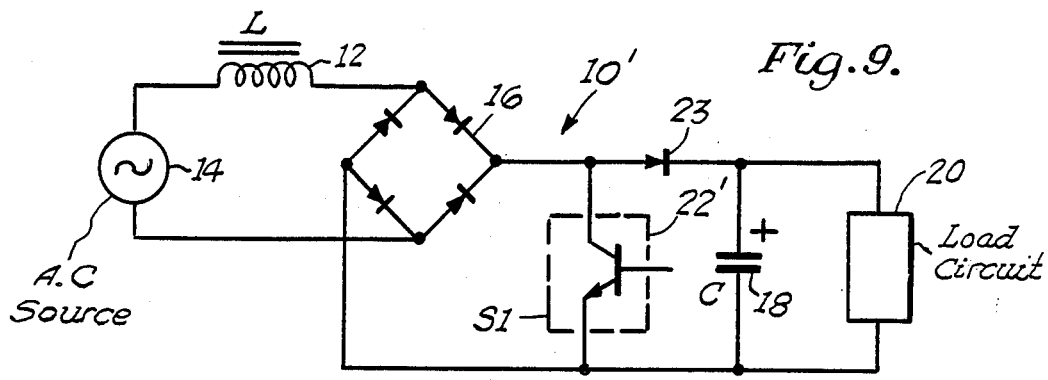
FIG. 9 is another embodiment of the power supply circuit.
Figure 10:
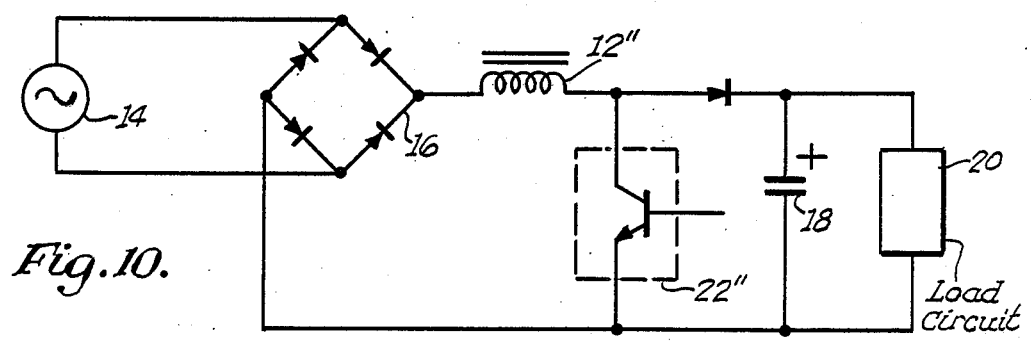
FIG. 10 is a further embodiment of the power supply circuit.
Figure 11:
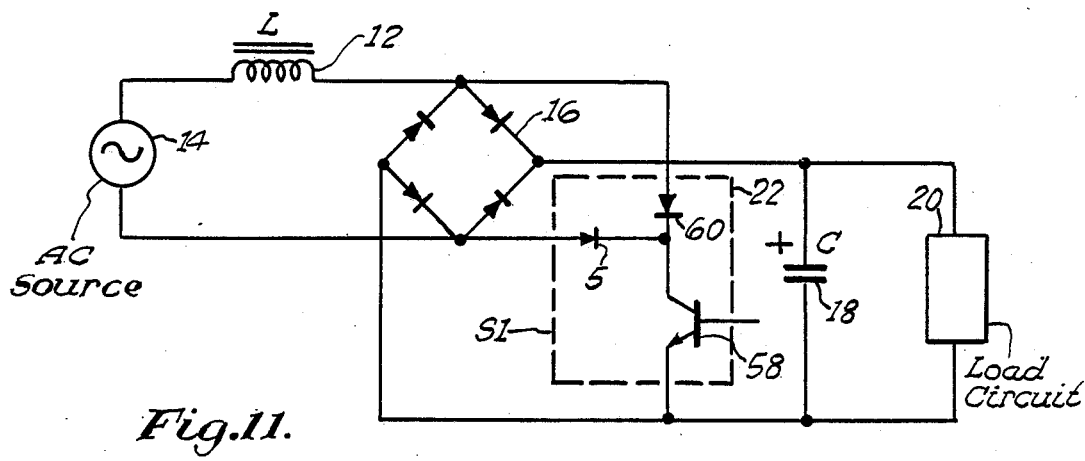
FIG. 11 is an additional embodiment of the power supply circuit.
Figure 12:
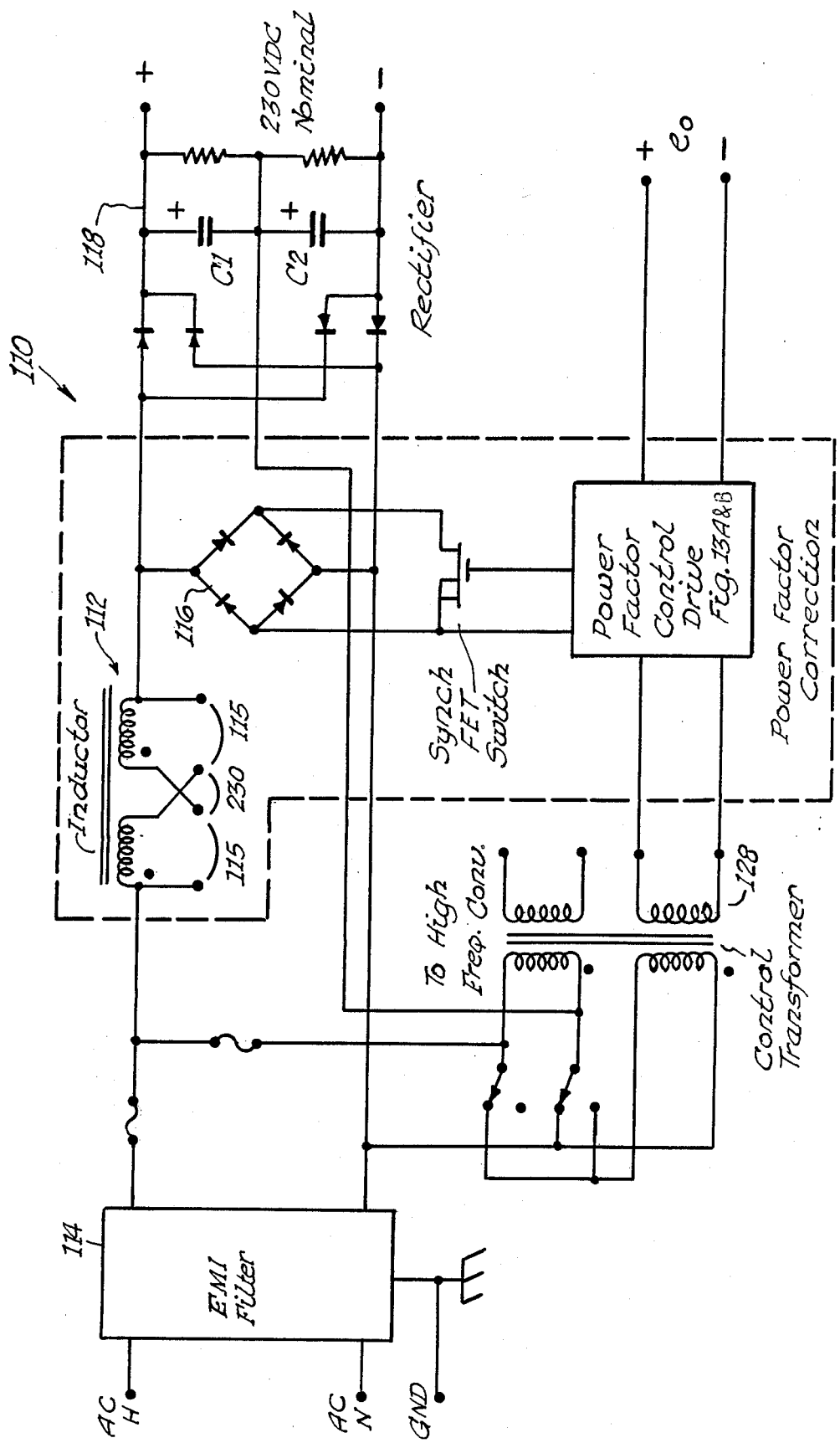
FIG. 12 is a partial preferred embodiment of the power supply circuit.

Alternate construction for the power factor correction circuit are shown in FIGS. 9, 10 and 11. Although the preferred embodiment is as shown in FIG. 1 and FIG. 12, other configurations are possible placing the inductor and switch in the output or DC side of the rectifier 16 as shown in FIGS. 9, 10 and 11.

FIG. 9 shows switch 22' connected across the output of rectifier 16. In this configuration, a rectifier must be inserted between the switch 22 and filter 18 to block current flow from the filter back into the switch 22' when 22' is conducting. This circuit adds another rectifier 23 in series with the load circuit reducing the circuit efficiency. Power factor improvement will be achieved as described as set forth above.

FIG. 10 shows both the inductor 12" and switch 22" connected across the output of rectifier 16. This circuit will have similar performance to that of FIG. 9. This circuit configuration shown in FIG. 10 will provide similar performance to that of FIG. 9 only under the condition that the current in inductor 12" goes to zero prior to the end of each AC cycle as it does in the circuit of FIG. 1.

FIG. 11 shows a configuration where the switch 22''' utilizes diodes 58 and 60 in combination with two diodes in rectifier 16 to provide performance similar to that described for FIG. 1. This circuit may be preferred over FIG. 1 where a full wave rectifier bridge and single capacitor filter is utilized as shown.

Figure 13A:
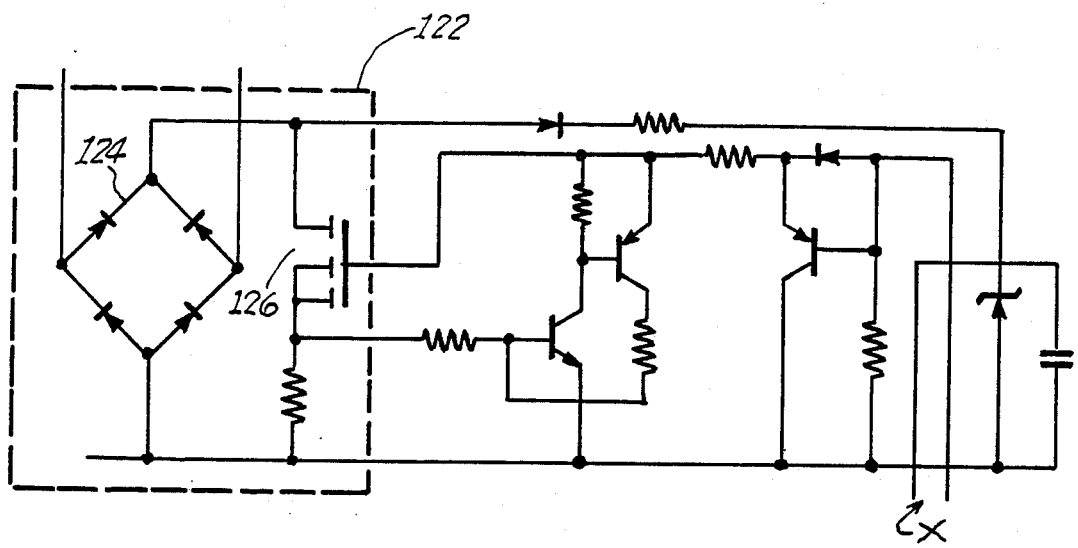
FIG. 13A is a second portion of the power supply circuit connected in FIG. 12.
Figure 13B:
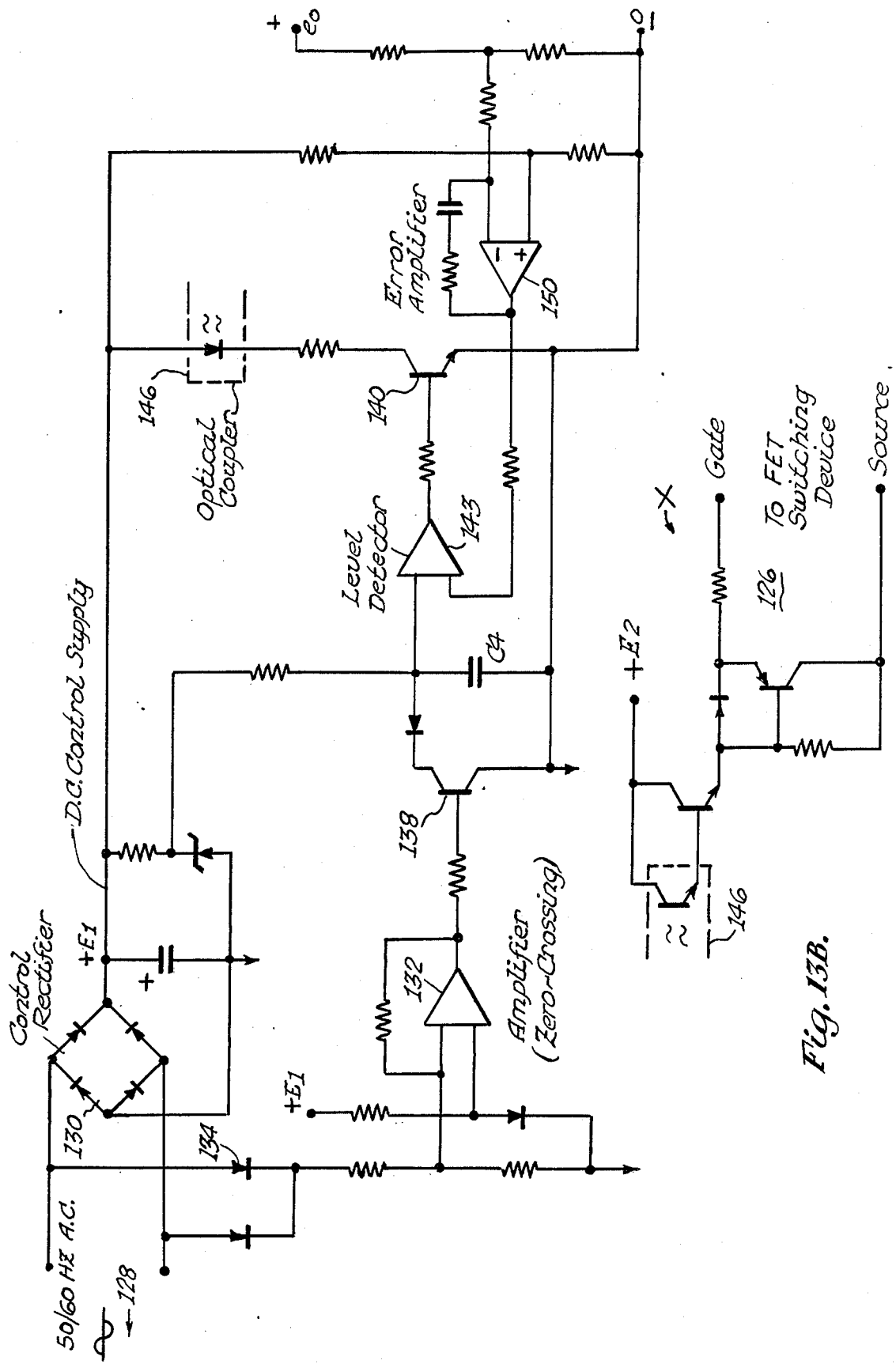
FIG. 13B is the last portion of the power supply circuit connected in FIG. 12 and interconnected to FIG. 13A at X.

A preferred embodiment of the invention is shown in FIGS. 12, 13A and 13B. An AC input 114 is connected to inductor 112 which is connected between the AC source 114 and bridge rectifier 116. It is common to configure a power supply to operate from either 115 VAC or 230 VAC sources with provision in the power supply to change by appropriate taps as shown. This is done by a rectifier 116, filter 118, and switch arrangement as shown. For 230 VAC operation the switch A is open and rectifier 116 operates as a conventional full wave bridge. For 115 VAC operation switch A is closed and rectifier 116 operates as a voltage doubler circuit. For either case, 115 or 230 VAC, the nominal DC output voltage across the load is the same. This allows the use of a high frequency switching power supply load circuit which operates from the same nominal voltage independent of the nominal AC input. Typically the voltage across the load 120 will be approximately 290 VDC with the AC input voltage at 115 VAC or 230 VAC.

For optimum power factor control the inductor 112 is tapped to provide an inductance at 230 VAC which is four (4) times the inductance at 115 VAC. This is easily done by providing two identical windings which are connected in parallel for 115 VAC operation and in series for 230 VAC operation. Utilizing this simple tapping arrangement, the power factor control is optimum for both AC input ranges. At 230 VAC the source current is one half the magnitude at 115 VAC and the inductive impedance for optimum power factor control must be four (4) times that at 115 VAC operation and 37.6 mhy for 230 VAC operation for a power supply rated to supply approximately 1000 watts of load to load circuit 120.

The active switch 122 is implemented with a simple bridge rectifier 124 and FET switch 126. By driving the gate terminal of 126 positive with respect to the source terminal the on resistance of 126 is low effectively providing a low impedance across the AC terminals of rectifier 124. This provides the short between the inductor 112 and rectifier 116 as described in the previous descriptions. The on-time $t_2 - t_1$ is controlled by the gate drive circuit and control circuit to be described further.

A tapped control transformer 128 is used to provide the control power and signals necessary for power factor control. The input windings are tapped in a conventional manner to operate from either 115 VAC or 230 VAC source systems. The secondary winding voltage is rectified by bridge rectifier 130 to provide a filtered DC voltage $E_1$, across capacitor C3 which is proportional to the source voltage. This voltage drives the control circuit and is used as the variable reference for power factor control.

A zero crossing detector 132 is used to synchronize the switching of switch 122. The zero crossing detector senses when the AC voltage crosses zero by the rectifier 134 and resistor divider circuit and provides a reset voltage to a ramp generator circuit 136. Capacitor C4 in the ramp generator circuit charges in an approximate linear relationship with time by a fixed supply source of current. The reset voltage is provided by the emitter of 138. At the zero crossing of the AC the output of the zero crossing detector goes to a low DC level pulling the base and emitter of 138 to a low DC level. This provides a low impedance discharge of 136 to reset the ramp generator. This occurs at each zero crossing of the AC source voltage. A level detector 143 senses the voltage across capacitor 136 and compares it to a variable DC signal derived from the output of the error amplifier 150. When the voltage across 136 goes low (or negative) with respect to the variable DC signal the output of the level detector is high and provides positive base drive to transistor 140. In turn this provides a current in the LED circuit of the opto-coupler 146 providing positive drive to the base of 142 and then 148. The emitter of 148 goes positive and provides positive gate drive to 126. 126 is in a conducting state immediately at the zero crossing of the AC source and remains conducting until the voltage across 136 becomes more positive then the output of the error amplifier. At this point 140 becomes nonconducting and 126 turns off. At this time current flowing in L transfers from the active switch 122 to the rectifier circuit 116.

The conduction time $t_2-t_1$ is a function of the voltage at the output of the error amplifier 150. $t_2-t_1$ goes to zero when the error signal goes to zero. $t_2-t_1$ increases in time when the error signal increases in a positive direction.

The voltage $e_o$ across the load circuit 120 is compared with a reference DC voltage $E_1$ which is proportional to the AC source voltage and the difference voltage is amplified by the error amplifier 150 to provide the control input to the level detector. If a disturbance causes $e_o$ to increase in magnitude the error amplifier provides a lower DC output signal which reduces the time $t_2-t_1$. A reduction in $t_2-t_1$ reduces the output voltage $e_o$ to correct for the change in $e_o$. The output voltage $e_o$ will be held constant for fixed values of $E_1$ at fixed values for AC input voltage. If the source voltage increases, $E_1$ will increase, and the output voltage $e_o$ will increase proportionally.

The voltage across the load will track or follow changes in AC input voltage, an important criteria for maintaining the power factor constant for variations in source voltage, frequency, and load.

This invention can be typically used for the normal power system frequencies at 50 to 60 Hz and may be used at military frequencies at 400 Hz.

A dynamic current limit circuit is provided to protect 126 under transient conditions. Current in 126 is sensed by resistor $R_1$ and when a threshold level is exceeded $Q_2$ turns on forcing $Q_3$ to conduct. Positive feedback through $R_2$ latches the circuit into a conductive state reducing the gate drive to turn the FET switch 126 off. The circuit is reset once each half cycle when the drive from 148 goes to zero.

Transistor $Q_4$ provides a low impedance turn-off signal when the drive from 148 goes to zero.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. A power supply circuit comprising:
   said power supply circuit connectable to an alternating current input voltage source; and
   an activate low frequency switch means connected to said power supply circuit and connectable to a load circuit;
   said active low frequency switch means includes a switching means and switching control means connected to said switching means and said power supply circuit;
   said power supply circuit including an inductance means and a rectifier means;
   said rectifier means for rectifying the alternating current to provide a rectified input current to the load circuit;
   said inductance means connected effectively in series with said rectifier means between the alternating current input voltage source and the load circuit, whereby current flows from the alternating current input voltage source to the load circuit through said inductance means;
   said active low frequency switch means is switch on and off to operate in synchronous relationship with the alternating current input voltage source, and
   said active low frequency switch means connected to said inductance means said rectifier means for building up stored energy in said inductance means from the alternating current input voltage source when said active low frequency switch means is in a conduction state and for forcing the current input to flow into the load circuit through at least a portion of said rectifier means when said active low frequency switch means is in a non-conduction state;
   said active low frequency switch means including said switching control means for switching said switching means into a conduction state and then into a non-conducting state once in each half cycle of the alternating current input voltage source waveform within the leading portion of the alternating current input voltage source waveform between the zero crossing and peak value of alternating current input voltage source waveform;
   said switching means for activation into conduction and then into non-conduction in synchronous relation to the alternating current input voltage waveform, said switching means for activation once in each half-cycle of the alternating voltage input waveform to provide a controlled build-up of stored energy in said inductance means during the leading portion of the alternating voltage input waveform; and
   said inductance means providing energy exchange between the alternating current input voltage source, inductance means, and said load circuit during the non-conduction time interval to provide further smoothing to the alternating current input current waveform;
   said power supply circuit including power factor correction means for controlling the alternating current input waveform to provide high power factor with said active low frequency switching means for providing a higher efficiency, lower cost, lower electromagnetic interference (EMI) over high frequency power factor correction systems.

2. A power supply circuit as set forth in claim 1 wherein:

said switching means activated into conduction for a controlled short time interval only during the leading portion of the alternating current input voltage source waveform where the voltage amplitude is increasing in magnitude and activated into a non-conduction state for the remainder of the alternating current half-cycle.

3. A power supply circuit as set forth in claim 1 wherein:

said alternating current input waveform and resulting high power factor being determined by optimum values for the magnitude of said inductance means and activation times for given condition of load current and alternating voltage input and frequency; and said short time interval being controlled to maintain high power factor for variations in alternating source voltage and load.

4. A power supply circuit as set forth in claim 2 wherein:

said alternating current input waveform and resulting high power factor being determined by optimum values for the magnitude of said inductance means and activation times for given condition of load current and alternating voltage input and frequency; and said short time interval being controlled to maintain high power factor for variations in alternating source voltage and load.

5. A power supply circuit as set forth in claim 4 wherein:

said active low frequency switch means connected to said load circuit including filter means connected in parallel with said load, said load circuit during the non-conduction time interval to provide further smoothing or filtering affect to the alternating current input current waveform.

6. A power supply circuit comprising:

said power supply circuit connectable to an alternating current input voltage source; and an active low frequency switch means connected to said power supply circuit and connectable to a load circuit;

said active low frequency switch means includes switching means nd switching control means connected to said switching means and said power supply circuit;

said power supply circuit including an inductance means and a rectifier means;

said rectifier means for rectifying the alternating current to provide a rectified input current to the load circuit;

said inductance means connected effectively in series with said rectifier means between the alternating current input voltage source and the load circuit, whereby current flows from the alternating current input voltage source to the load circuit through said inductance means;

said active low frequency switch means is switched on and off to operate in synchronous relationship with the alternating current input voltage source, and said active low frequency switch means connected to said inductance means and said rectifier means for building up stored energy in said inductance means from the alternating current input voltage source when said active low frequency switch means is in a conduction state and for forcing the current input to flow into the load circuit through at least a portion of said rectifier means when said active low frequency switch means is in a non-conduction state;

said active low frequency switch means including said switching control means for switching said switching means into a conduction state and then into a non-conducting state once in each half cycle of the alternating current input voltage source waveform within the leading portion of the alternating current input voltage source waveform between the zero crossing and peak value of alternating current input voltage source waveform;

said switching means activated into conduction for a controlled short time interval only during the leading portion of he alternating current input voltage source waveform where the voltage amplitude is increasing in magnitude and activated into a non-conduction state for the remainder of the alternating current half-cycle; and said inductance means providing energy exchange between the alternating current input voltage source, inductance means, and said load circuit during the non-conduction time interval to provide further smoothing to the alternating current input current waveform;

said power supply circuit including a power factor correction means for controlling the alternating current input waveform to provide high power factor with said active low frequency switching means for providing higher efficiency, lower cost, lower electromagnetic interference (EMI) over high frequency power factor correction systems.

7. A power supply circuit as set forth in claim 6 wherein:

said alternating current input waveform and resulting high power factor being determined by optimum values for the magnitude of said inductance means and activation times for given condition of load current and alternating voltage input and frequency; and said short time interval being controlled to maintain high power factor for variations in alternating source voltage and load.

* * * * *